J. G. HEASLET.
GEARING.
APPLICATION FILED JULY 27, 1910.

1,010,628.

Patented Dec. 5, 1911.

3 SHEETS—SHEET 1.

Witnesses:
Herman Eisele
Winifred Waltz

Inventor
James G. Heaslet
by W. E. Merkel
his Attorney.

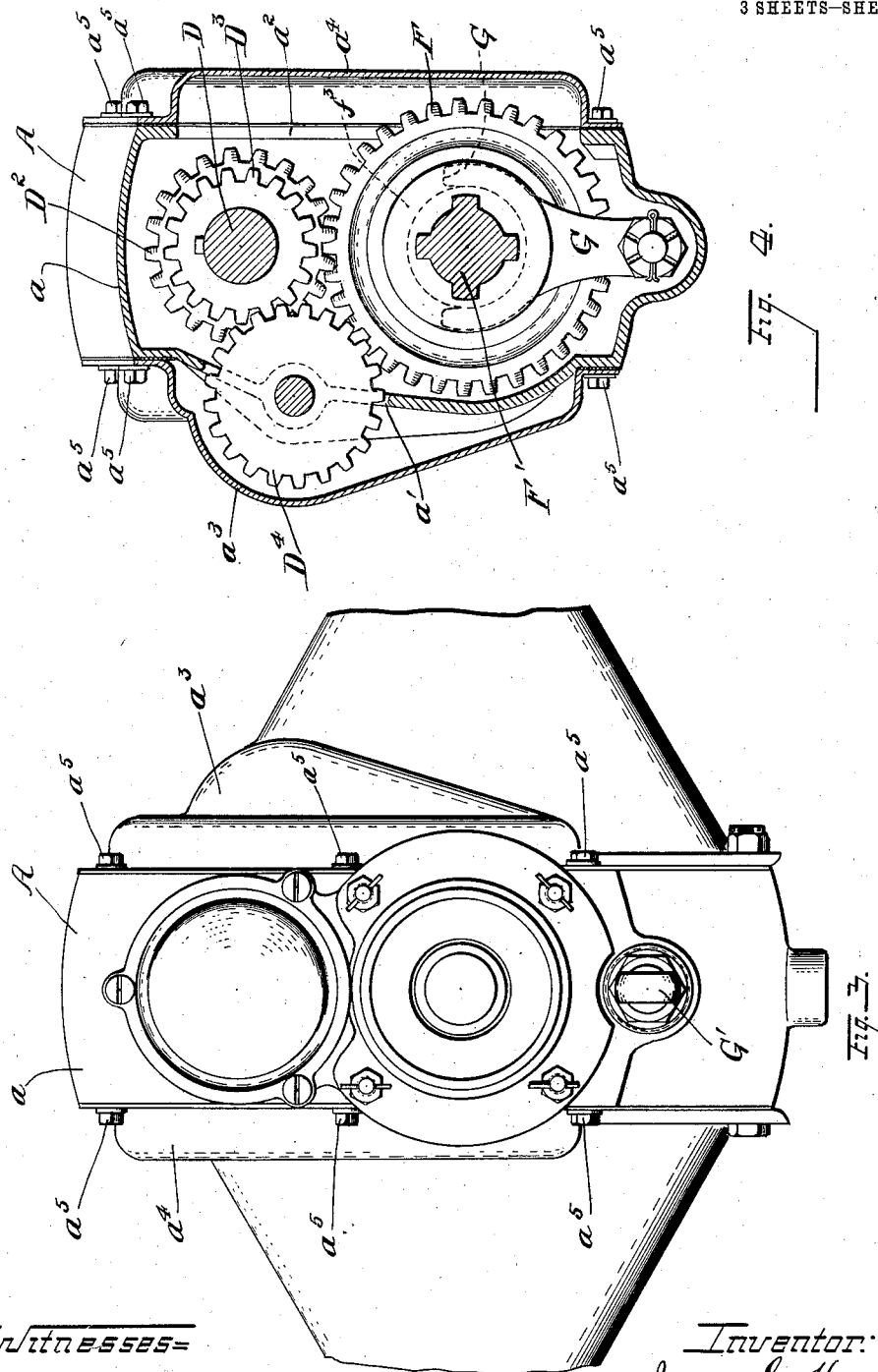

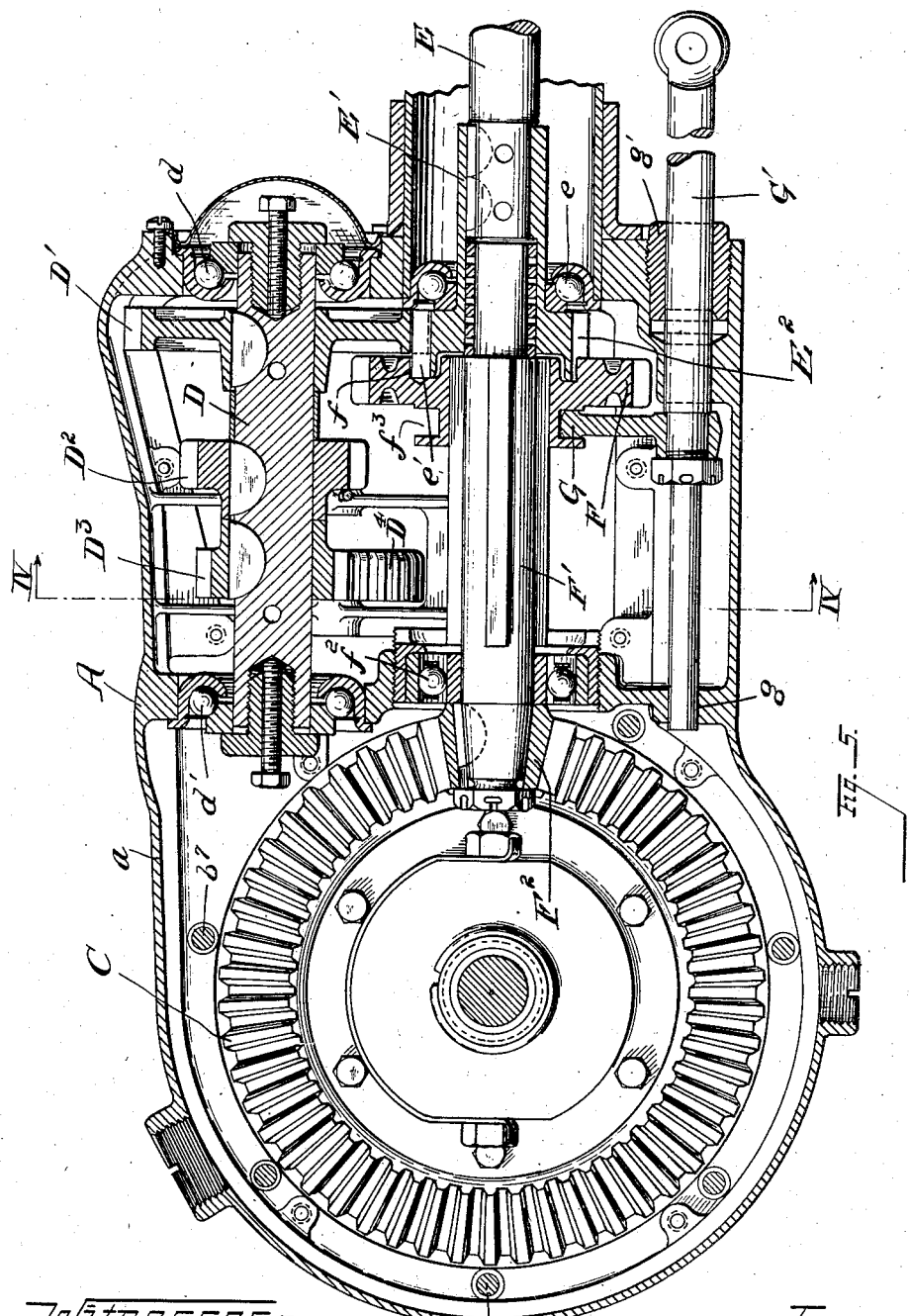

UNITED STATES PATENT OFFICE.

JAMES G. HEASLET, OF DETROIT, MICHIGAN, ASSIGNOR OF ONE-HALF TO WALTER E. FLANDERS, OF PONTIAC, MICHIGAN.

GEARING.

1,010,628.  Specification of Letters Patent.  Patented Dec. 5, 1911.

Application filed July 27, 1910. Serial No. 574,130.

*To all whom it may concern:*

Be it known that I, JAMES G. HEASLET, a citizen of the United States, resident of Detroit, county of Wayne, and State of Michigan, have invented a new and useful Improvement in Gearing, of which the following is a specification, the principle of the invention being herein explained and the best mode in which I have contemplated applying that principle, so as to distinguish it from other inventions.

My invention relates to transmission mounting for automobiles, its object being to arrange such transmission and adjacent parts in an economical and efficient manner, and particularly with a view to rendering the transmission change speed gears readily accessible for inspection, removal or repairs.

The said invention consists of means hereinafter fully described and particularly set forth in the claims.

The annexed drawings and the following description set forth in detail certain mechanism embodying my invention, the disclosed means, however, constituting but one of various mechanical forms in which the principle of the invention may be applied.

Figure 1:
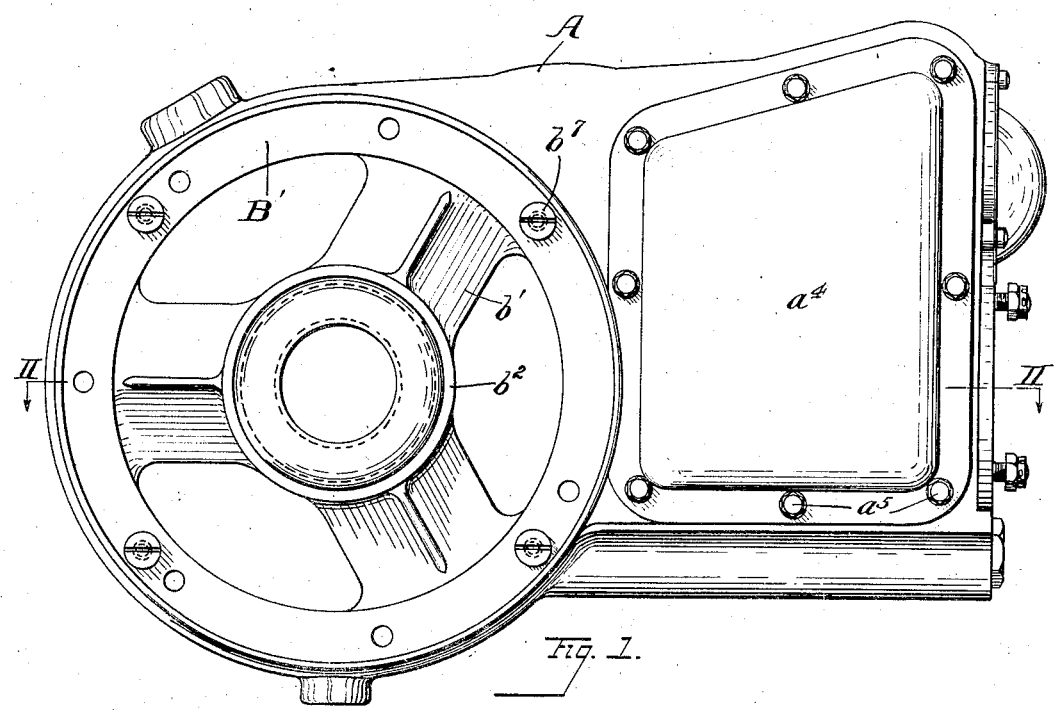
Figure 2:
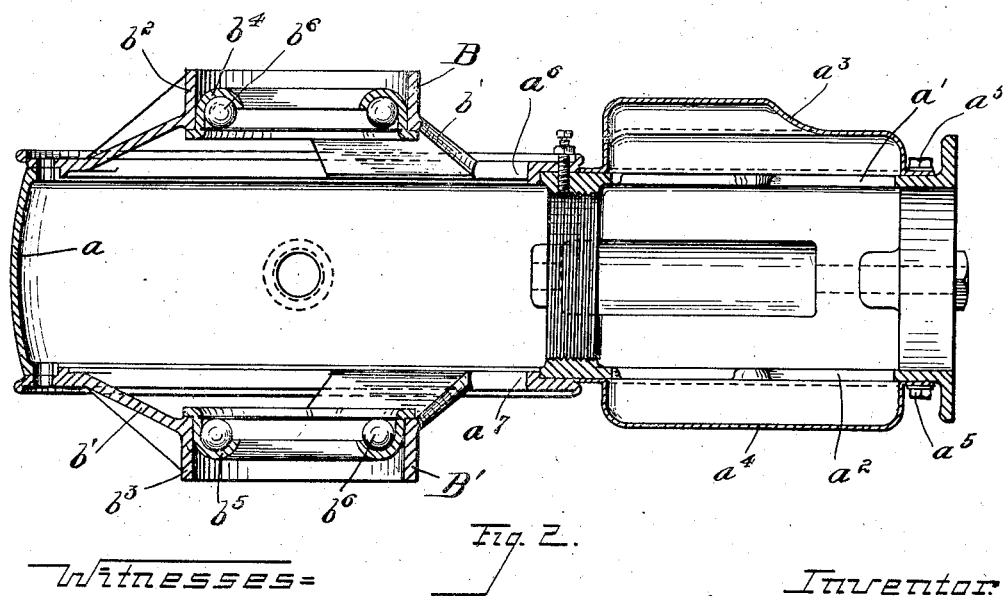

In said annexed drawings:—Figure 1 is a side elevation of the housing for the transmission mechanism arranged in accordance with my invention. Fig. 2 is a horizontal section taken upon the plane indicated by line II—II in Fig. 1, the interior transmission mechanism being shown removed. Fig. 3 is a front elevation of said housing and adjacent parts. Fig. 4 is a vertical transverse section taken upon the plane indicated by line IV—IV in Fig. 5, and viewed in the direction indicated by the arrow. Fig. 5 is a longitudinal section of the transmission mechanism, housing, and adjacent parts.

The housing A comprises a main central body portion $a$ which is formed at the front portion with two lateral openings $a'$ $a^2$. These openings are of substantially the same area, and are closed by means of plates, $a^3$ and $a^4$ respectively, which are secured in place by means of screws $a^5$, Figs. 1 and 2. At the rear of the housing are formed also upon opposite sides two openings $a^6$ and $a^7$, respectively, and adjacent these openings are secured the bearing plates B and B'. These plates are formed with spiders $b$ and $b'$ respectively, and their central portions are formed with the bearing bosses $b^2$ and $b^3$ respectively. These bosses carry the bearing cups $b^4$ $b^5$ for the balls $b^6$ which form the bearings for the rear axle, as described in an application for U. S. Letters Patent, filed July 27, 1910, Serial No. 574,129. As also described in said co-pending application, within this portion of the housing is mounted the main bevel driving gear C. The openings $a^6$ $a^7$ are made of a diameter such that this driving gear may be slipped laterally within the housing when either of the plates B or B' is removed. These plates are secured by means of screws $b^7$, by means of which such removal may be readily effected. The change speed mechanism is located in the forward part of this housing, and laterally adjacent to the openings $a'$ $a^2$. This mechanism includes a spindle D mounted in ball bearings $d$ $d'$, and carrying the three pinions D' D$^2$ and D$^3$, of varying diameter, as shown, said gears being securely keyed to said spindle. Pinion D$^3$ meshes with a laterally placed gear D$^4$, Figs. 4 and 5. The rear end of the driving shaft E is keyed to a sleeve E' mounted in the ball bearing $e$, and the inner end of this sleeve carries a pinion E$^2$ whose rear face is provided with the clutch fingers $e'$. These clutch fingers are adapted to engage complementary clutch depressions $f$ formed upon the front face of the driving pinion F. This latter gear is keyed to a shaft F' whose rear end is mounted in ball bearings $f^2$, and keyed to the rearmost extremity of such shaft is the driving bevel pinion F$^2$, which meshes with the driving bevel gear C. The pinion E$^2$ meshes with pinion D', and the periphery of the pinion F is in alinement with the peripheries of pinions D$^2$ and D$^4$. The rear end of pinion F is formed with a groove $f^3$ which receives the shifting fork, G, whose lower end is secured to the shifting rod G'. This rod is mounted in suitable bearings $g$ and $g'$, formed in the lower part of the housing.

Assuming the parts to be in the positions shown in Fig. 5, in which the clutch fingers $e'$ engage the pinion F, it will be seen that the rotation of the shaft E will effect the rotation of the pinion F, and by reason of the latter's fixed connection with the shaft F', will effect the rotation of the latter, and through it the rear axle will be driven through the medium of the bevel gears, as will be readily understood. A direct shaft drive is thus procured, the spindle D and the gears connected therewith all being driven idly. By shifting the rod G' so as to move the pinion F to the left a distance sufficient to disengage the clutch fingers, but not sufficient to cause its teeth to engage the pinion $D^2$, no rotation of the shaft F' will be effected, and the shaft D will be driven idly, thus procuring a neutral position, in which the driving shaft E is entirely disconnected from the rear axle. A further movement to the left on the part of the shifting rod G' will cause the pinion F to engage the pinion $D^2$. The latter pinion will be, therefore, driven by spindle D, which receives its movement from the pinion D', the latter being rotated by the pinion $E^2$ driven by the shaft E. A rotation of the rear axle at a given speed is thus obtained, which speed varies from that obtained by the direct connection of the shaft with the driving bevel gears. A further movement of the rod G' to the left will cause the pinion F to engage the pinion $D^4$. This latter pinion being in mesh with the pinion $D^3$ will therefore drive the shaft F' in the opposite direction, and a reverse movement of the rear axle will be obtained.

As will be readily understood, the gears are so proportioned that the speed obtained when pinions $D^2$ and F are in engagement will be less than that obtained by the direct drive, and the speed obtained during the reversed movement of the rear axle will be comparatively low, as is customary in the construction of automobiles.

Having fully described my invention, what I claim therefore and desire to secure by Letters Patent is:

1. In a transmission mounting, a housing formed in forward and rear chambers each having lateral openings therein, transmission mechanism mounted in said forward chamber, removable cover plates closing said forward opening, a driving gear mounted in said rear chamber and removable cover plates closing said rear openings.

2. In a transmission mounting, a housing formed in forward and rear chambers each having lateral openings therein, transmission mechanism mounted in said forward chamber, removable cover plates closing said forward openings, a driving gear mounted in said rear chamber, and removable cover plates provided with bearing rings for said driving gear closing said rear openings.

3. In a transmission mounting, a housing, a partition dividing said housing into forward and rear chambers, each of said chambers having lateral openings therein, transmission mechanism mounted in said forward chamber, removable cover plates closing said forward openings, a driving gear mounted in said rear chamber, and removable cover plates closing said rear openings and provided with bearings for said driving gear.

Signed by me, this 26th day of July, 1910.

JAMES G. HEASLET.

Attested by—
JAMES E. SPENCER,
FRANK A. BATES.